1-(4-FLUOROPHENOXYPROPYL)-4-ANILINO-PIPERIDINES

DETAILED DESCRIPTION OF THE INVENTION

The present invention is directed to 1,4-disubstituted piperidine derivatives of the formula

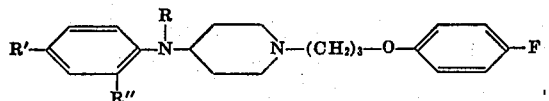

wherein R' is fluorine, chlorine or methoxy, R'' is hydrogen or methyl and R is hydrogen or methyl. The above compounds and their non-toxic acid addition salts show pronounced analgesic activity with oral $ED_{50}$ values between 10 and 25 mg./kg. while their toxicities show oral $LD_{50}$ values of 200 to 400 mg./kg. The therapeutic index values are generally between 10 and 25.

The new compounds of the present invention are made by simple and known procedural steps. In a general embodiment, the above three-ring containing compounds are prepared by condensing the piperidine moiety first with the properly substituted aniline derivatives and subsequently introducing the p-fluorophenoxypropyl chain. The compounds wherein R is methyl can be made from the corresponding three-ring compounds wherein R is hydrogen or, the methyl group can be introduced into the two-ring intermediate. The condensation for the two-ring intermediate is usually carried out by condensing 4-piperidone, carrying a protective group on the nitrogen, with the corresponding aniline, followed by reduction of the obtained Schiff base and cleavage of the protective group. As mentioned, the optional methyl group R can be introduced at this point, i.e., prior to the condensation which forms the three-ring unit.

The condensation of the 4-(substituted anilino)-piperidine is best carried out with 3-(p-fluorophenoxy)-1-bromopropane to produce the compound of the above structure. If R is methyl, said group can be introduced prior or following this condensation. In either case, the known reaction using formaldehyde and formic acid for the methylation is used.

A convenient form for administration of the above compounds to patients requiring treatment with analgesics is the oral route. For this route, the preferred component is a nontoxic acid addition salt of the above described three-unit compound, for instance, the hydrochloride, sulfate, phosphate, acetate, citrate, tartrate or succinate. These salts can easily be granulated and/or compounded into common dosage forms using the usual excipients, flavoring agents, fillers and the like often used in pharmaceutical tablets or suspensions. Other active components may be combined with the above active ingredients and the granules or tablets may be coated in usual fashion.

In order to illustrate the preparation of specific compounds of the present invention, reference is made to the following examples which, however, are not meant to limit the scope of this invention in any fashion. In all these examples, the compounds named were identified by chemical analysis, showing excellent agreement with their calculated formulas.

EXAMPLE 1

N-[3-(p-Fluorophenoxy)propyl]-4-(p-Fluoroanilino)piperidine Dihydrochloride a. 1-Carbethoxy-4-Piperidone A solution of 83.6 g. of 4,4-diethoxypiperidine and 60.6 g. of triethylamine dissolved in 500 ml. of ether was cooled in an ice bath to below 10°C. To this solution, 60.0 g. of ethyl chloroformate was added dropwise, keeping the temperature below 15°C. At the end of the addition, the reaction mixture was stirred at room temperature overnight. After this time, the reaction mixture was filtered to remove the triethylamine hydrochloride and the filter cake was washed with fresh ether. The filtrate was concentrated by heating on a steam bath. The residue was dissolved in 500 ml. of ethyl alcohol and this solution was diluted with 50 ml. of concentrated hydrochloric acid and 50 ml. of water. This solution was heated on a steam bath to reflux for five minutes and then concentrated in vacuo. The residue was dissolved in chloroform, the layers were separated and the organic layer was dried over magnesium sulfate, filtered and concentrated to leave a colorless oil which was purified by vacuum distillation; b.p. 100°/2mm; $N_D^{25°}$ 1.4716.

b. N-(1-Carbethoxy-4-Piperidylidene)-p-Fluoroaniline

A solution of 11.1 g. of p-fluoroaniline, 17.1 g. of 1-carbethoxy-4-piperidone, 500 mg. of p-toluenesulfonic acid hydrate in 250 ml. of toluene was heated to reflux and the water formed was collected by a Dean-Stark water separator. After refluxing for 24 hours, 1.9 ml. of water was collected (theory 1.8 ml.). The reaction mixture was washed with a 5 percent sodium bicarbonate solution. The layers were separated and the organic layer was dried over magnesium sulfate, filtered and concentrated to leave an oil. The oil was distilled by vacuum distillation. b.p. 158°/2mm; $N_D^{25°}$ 1.5325, and was obtained in a yield of 18 g.

c. 1-Carbethoxy-4-(p-Fluoroanilino)piperidine

A solution of 17.7 g. of N-(1-carbethoxy-4-piperidylidene)-p-fluoroaniline dissolved in 125 ml. of ethanol was hydrogenated at 3 atmospheres pressure in the presence of 3.5 g. 5 percent palladium on charcoal. When uptake was complete, the mixture was filtered and the catalyst was washed with fresh solvent. The filtrate was concentrated to leave an oil which crystallized. This product was purified by recrystallization from acetone-hexane and was obtained in a yield of 14.46 g. (81%); mp. 85°–6° C.

d. 4-(p-Fluoroanilino)piperidine

A suspension of 14.2 g. of 1-carbethoxy-4-(p-fluoroanilino)piperidine in 250 ml. of 6N HCl was heated to reflux for 24 hours. The resulting solution was concentrated to remove most of the solvent. The mixture was made basic with 50 percent aqueous sodium hydroxide while cooling in an ice bath. A solid separated and the aqueous layer was extracted with 3 portions of 250 ml. each of chloroform. The layers were separated and the organic layer was dried over $MgSO_4$, filtered and concentrated to leave a pale, yellow colored solid. Recrystallized from acetone-hexane yielded the pure compound melting at 112°–113°C.

e. N-[3-(p-Fluorophenoxy)propyl]-4-(p-Fluoroanilino)piperidine Dihydrochloride

A solution of 8.82 g. of 4-(p-fluoroanilino)piperidine, 10.9 g. of 3-(p-fluorophenox-

CYANOPHENYL-1,4-DIHYDROPYRIDINE DERIVATIVES

The present invention is concerned with 1,4-dihydropyridine derivatives. More particularly, the present invention is concerned with cyanophenyl-1,4-dihydropyridine derivatives of the formula:

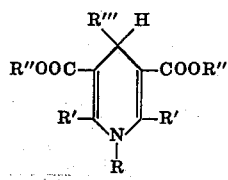

wherein
R is hydrogen, saturated or unsaturated, straight, branched or cyclic alkyl of one to six carbon atoms, unsubstituted or substituted by hydroxyl or alkoxy of one to three carbon atoms, or benzyl or phenethyl unsubstituted or substituted in the aryl moiety by 1, 2 or 3 members selected from the group consisting of 1 to 3 alkoxy moieties of one to three carbon atoms, 1 or 2 alkyl moieties of one to three carbon atoms and 1 or 2 halogen atoms, especially fluorine, chlorine or bromine, R' is straight or branched chain alkyl of one to four carbon atoms, R'' is straight, branched, cyclic, saturated or unsaturated alkyl of one to six carbon atoms, said alkyl interrupted by 1 or 2 oxygen atoms or said alkyl substituted by hydroxyl, and R''' is aryl substituted by cyano or by cyano and 1 to 9 members selected from the group consisting of cyano, nitro, amino, acylamino of 1 to 2 carbon atoms, hydroxyl, acyloxy of one to two carbon atoms, 1 or 2 alkyl moieties of one to four carbon atoms, 1 or 2 alkoxy moieties of one to four carbon atoms, and 1 or 2 halogen atoms, especially fluorine, chlorine or bromine.

These compounds are especially useful for their coronary dilating effect and their antihypertensive effect, and when administered for these purposes, the compounds of the present invention are administered in the same general manner and amount as known coronary dilators and known antihypertensives.

The compounds of the present invention may be produced by reacting an aldehyde of the formula;

wherein R''' is as above defined, with an acyl-fatty acid ester of the formula:

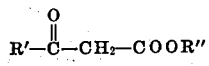

wherein R' and R'' are as above defined, and ammonia or an amine of the formula:

or a salt thereof, wherein R is as above defined, or with an enamine of the formula:

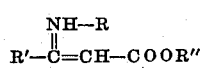

wherein R, R' and R'' are as above defined, in an organic solvent, such as an alcohol, dioxane, glacial acetic acid, dimethylformamide, dimethylsulphoxide or acetonitrile or in water at elevated temperatures, preferably at the boiling point of the solvent.

When the compounds of the present invention are produced, wherein R is other than hydrogen, a preferred embodiment of the process, comprises carrying out the reaction in pyridine. This general process is described in German Pat. application No. P 19 23 990.8 which corresponds to U.S. application, Ser. No. 35,574 filed May 7, 1970.

It is further possible to produce the compounds of the present invention according to teachings set forth in Helv. Chim. Acta 41, (1958) 2066, by oxidizing 1,4-dihydropyridines, wherein R is hydrogen, with an oxidizing agent, quaternizing the resulting pyridine derivatives with alkyl esters and reducing these again with suitable reducing agents to form 1,4-dihydropyridines.

The following specific compounds are representative but not exhaustive examples of the various reactants which can be used according to the present invention:

Aldehydes
2-, 3- or 4-cyanobenzaldehyde, 2-nitro-4-cyanobenzaldehyde, 2-nitro-3-hydroxy-4-cyanobenzaldehyde, 4-chloro-3-cyano-benzaldehyde.

Acyl-fatty acid esters
Formylacetic acid ethyl ester, formylacetic acid butyl ester, acetoacetic acid methyl ester, acetoacetic acid ethyl ester, acetoacetic acid propyl ester, acetoacetic acid isopropyl ester, acetoacetic acid butyl ester, acetoacetic acid (α- or β)- hydroxyethyl ester, acetoacetic acid (α- or β)-methoxyethyl ester, acetoacetic acid (α- or β)-ethoxyethyl ester, acetoacetic acid (α- or β)-propoxyethyl ester, acetoacetic acid furfuryl ester, acetoacetic acid tetrahydrofurfuryl ester, acetoacetic acid allyl ester, acetoacetic acid propargyl ester, acetoacetic acid cyclohexyl ester, propionylacetic acid ethyl ester, butyryl-acetic acid ethyl ester and isobutyryl-acetic acid ethyl ester.

Amines
Methylamine, ethylamine, propylamine, isopropylamine, butylamine, allylamine, propargylamine, 1-hydroxyethyl-amine-2, 1,3-dihydroxyisopropylamine, cyclohexylamine, benzylamine, 4-chlorobenzylamine, 3,4-dimethoxybenzylamine and phenethylamine.

According to a preferred embodiment of the invention, R is hydrogen, alkyl of one to six carbon atoms and especially one to three carbon atoms, or benzyl, R'' is straight or branched chain alkyl of one to six carbon atoms, and especially of one to three carbon atoms, said alkyl interrupted by 1 oxygen atom, furfuryl, alkenyl of 2 to 6 carbon atoms, and especially two or three carbon atoms or alkinyl of two to six carbon atoms, and especially two or three carbon atoms, and R''' is phenyl substituted by cyano or by cyano and a member selected from the group consisting of cyano, nitro, amino, acylamino of one to two carbon atoms, hydroxyl, acyloxy of one to two carbon atoms, 1 or 2 alkyl moieties of one to four carbon atoms, 1 or 2 alkoxy moieties of one to four carbon atoms, and 1 or 2 halogen atoms, and especially cyano, cyano and chloro or cyano and nitro.

Five g 4-cyanobenzaldehyde are heated with 20 cc aceto-acetic acid n-butyl ester and 5 cc benzylamine in 30 cc pyridine at 90° to 100° C for 3 hours, the mixture is poured into ice-water, suction-filtered, and 10 g yellow-white crystals of m.p. 116° C are obtained from methanol.

The present invention also includes pharmaceutical compositions which comprise one of the above set forth compounds according to the present invention in combination with a pharmaceutically acceptable non-toxic inert diluent or carrier. Said pharmaceutical compositions are made according to the techniques which are per se well known in the art. Any of the usual carriers, diluents, excipients and the like may be utilized according to standard techniques. Such tablets, capsules, dragees, solutions, suspensions and the like form part of the present invention. Also a part of the present invention is the method of effecting coronary action in humans and animals which comprises administering to a human or animal in need thereof a therapeutically effective amount of a compound of the present invention until amelioration of the condition occurs.

What is claimed is:
1. A cyanophenyl-1,4-dihydropyridine derivative of the formula:

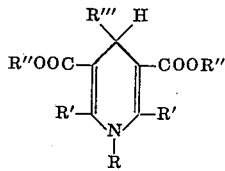

wherein
R is hydrogen, saturated or unsaturated, straight, branched or cyclic alkyl of one to six carbon atoms, unsubstituted or substituted by hydroxyl or alkoxy of one to three carbon atoms, or benzyl or phenethyl unsubstituted or substituted in the aryl moiety by 1, 2 or 3 members selected from the group consisting of 1 to 3 alkoxy moieties of one to three carbon atoms, 1 or 2 alkyl moieties of one to three carbon atoms and 1 or 2 halogen atoms, R' is straight or branched chain alkyl of one to four carbon atoms, R'' is straight, branched, cyclic, saturated or unsaturated alkyl of one to six carbon atoms, said alkyl interrupted by 1 or 2 oxygen atoms or said alkyl substituted by hydroxyl, and R''' is "cyanophenyl or cyanophenyl substituted by nitro or halogen".

2. A compound according to claim 1, wherein
R is hydrogen, alkyl of one to six carbon atoms,
R'' is straight or branched chain alkyl of one to six carbon atoms, said alkyl interrupted by 1 oxygen atom, furfuryl, alkenyl of two to six carbon atoms or alkynyl of two to six carbon atoms, and
R''' is and replaced by the terminology cyanophenyl or cyanophenyl substituted by nitro or halogen.

3. A compound according to claim 1 wherein
R is hydrogen, methyl or benzyl,
R' is methyl or ethyl,
R'' is methyl, ethyl, isopropyl, butyl, β-propoxyethyl, furfuryl, allyl or propargyl, and
R''' is cyanophenyl, cyano-chlorophenyl or nitro-cyanophenyl.

4. The compound according to claim 1 which is 2,6-dimethyl -4-(4'-cyanophenyl)-1,4-dihydropyridine-3,5-dicarboxylic acid methyl ester.

5. The compound according to claim 1 which is 2,6-dimethyl-4-(3'-cyanophenyl)-1,4-dihydropyridine-3,5-dicarboxylic acid diethyl ester.

6. The compound according to claim 1 which is 2,6-dimethyl-4-(3'-cyano-4'-chlorophenyl)-1,4-dihydropyridine-3,5-dicarboxylic acid dimethyl ester.

7. The compound according to claim 1 which is 2,6-dimethyl-4-(3'-cyanophenyl)-1,4-dihydropyridine-3,5-dicarboxylic acid diisopropyl ester.

8. The compound according to claim 1 which is 2,6-dimethyl-4-(3'-cyanophenyl)-1,4-dihydropyridine-3,5-dicarboxylic acid diallyl ester.

9. The compound according to claim 1 which is 4-(2'-cyanophenyl)-2,6-dimethyl-1,4-dihydropyridine-dicarboxylic acid dimethyl ester.

10. The compound according to claim 1 which is 4-(2'- -cyanophenyl)-2,6-dimethyl-1,4-dihydropyridine-dicarboxylic acid diethyl ester.

11. The compound according to claim 1 which is 1,2,6-trimethyl-4-(3'-cyanophenyl)-1,4-dihydropyridine-3,5-dicarboxylic acid diethyl ester.

12. The compound according to claim 1 which is 1,2,6-trimethyl-4-(2'-cyanophenyl)-1,4-dihydropyridine-3,5-dicarboxylic acid dimethyl ester.

13. The compound according to claim 1 which is 1,2,6-trimethyl-4-(3'-cyanophenyl)-1,4-dihydropyridine-3,5-dicarboxylic acid di-(β-propoxyethylester).

14. The compound according to claim 1 which is 1,2,6-trimethyl-4-(3'-cyano-4'-chlorophenyl)-1,4, dihydropyridine-3,5-dicarboxylic acid diallyl ester.

15. The compound according to claim 1 which is 1-methyl-2,6-diethyl-4-(3'-cyano-4'-chlorophenyl)-1,4-dihydro-pyridine-3,5-dicarboxylic acid diethyl ester.

16. The compound according to claim 1 which is 1,2,6-trimethyl-4-(2'-cyanophenyl)-1,4-dihydropyridine-3,5-dicarboxylic acid diethyl ester.

17. The compound according to claim 1 which is 1,2,6-trimethyl-4-(2'-cyanophenyl)-1,4-dihydropyridine-3,5-dicarboxylic acid diisopropyl ester.

18. The compound according to claim 1 which is 1,2,6-trimethyl-4-(2'-cyanophenyl)-1,4-dihydropyridine-3,5-dicarboxylic acid diallyl ester.

19. The compound according to claim 1 which is 1,2,6-trimethyl-4-(3'-nitro-4'-cyanohpenyl)-1,4-dihydropyridine-3,5-dicarboxylic acid dimethyl ester.

20. The compound according to claim 1 which is 1,2,6-trimethyl-4-(3'-cyanophenyl)-1,4-dihydropyridine-3,5-dicarboxylic acid difurfuryl ester.

21. The compound according to claim 1 which is 1,2,6-trimethyl-4-(3'-cyano-4'-chlorophenyl)-1,4-dihydropyridine-3,5-dicarboxylic acid dipropargyl ester.

22. The compound according to claim 1 which is N-benzyl-2,6-dimethyl-4-(4'-cyanophenyl)-1,4-dihydropyridine-3,5-dicarboxylic acid di-n-butyl ester.

* * * * *

UNITED STATES PATENT OFFICE
CERTIFICATE OF CORRECTION

Patent No. 3,691,177                                    Dated September 12, 1972

Inventor(s) Friedrich Bossert et al.

It is certified that error appears in the above-identified patent and that said Letters Patent are hereby corrected as shown below:

Column 1, line 65, the structural formula should read as follows:

$$-- \quad R'-\underset{\underset{NH-R}{|}}{C}=CH-COOR'' \quad --$$

Column 5, lines 51 and 52 should read as follows:

-- $R'''$ is cyanophenyl or cyanophenyl substituted by nitro or halogen.

Column 5, line 59 should read as follows:

-- $R'''$ is cyanophenyl

Column 6, line 52 should read as follows:

-- 1,2,6-trimethyl-4-(3'-nitro-4'-cyanophenyl)-1,4-    --

Signed and sealed this 15th day of July 1975.

(SEAL)
Attest:

RUTH C. MASON
Attesting Officer

C. MARSHALL DANN
Commissioner of Patents
and Trademarks